United States Patent
Iyengar et al.

(10) Patent No.: US 10,275,323 B2
(45) Date of Patent: *Apr. 30, 2019

(54) RESILIENT PROGRAMMING FRAMEWORKS FOR HANDLING FAILURES IN PARALLEL PROGRAMS

(71) Applicant: International Business Machines Corporation, Armonk, NY (US)

(72) Inventors: Arun Iyengar, Yorktown Heights, NY (US); Joshua J. Milthorpe, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 33 days.

This patent is subject to a terminal disclaimer.

(21) Appl. No.: 15/481,932

(22) Filed: Apr. 7, 2017

(65) Prior Publication Data

US 2017/0212812 A1   Jul. 27, 2017

Related U.S. Application Data

(63) Continuation of application No. 14/749,835, filed on Jun. 25, 2015, now Pat. No. 9,652,337, which is a
(Continued)

(51) Int. Cl.
*G06F 11/14* (2006.01)
*G06F 11/00* (2006.01)

(52) U.S. Cl.
CPC .......... *G06F 11/1469* (2013.01); *G06F 11/00* (2013.01); *G06F 11/1451* (2013.01); *G06F 2201/84* (2013.01)

(58) Field of Classification Search
CPC ............. G06F 11/1433; G06F 11/1451; G06F 11/1471; G06F 11/3644
See application file for complete search history.

(56) References Cited

U.S. PATENT DOCUMENTS

| 6,266,781 B1 | 7/2001 | Chung et al. |
| 6,446,057 B1 | 9/2002 | Vaughan |

(Continued)

FOREIGN PATENT DOCUMENTS

| CN | 101377750 | 9/2008 |
| CN | 103853634 | 6/2014 |
| JP | 10187616 | 7/1998 |

OTHER PUBLICATIONS

Hao Z., Xie C., Chen H., and Zang B.; "X10-FT: Transparent fault tolerance for APGAS language and runtime"; Parallel Computing, 40, No. 2; Feb. 1, 2014; available online Dec. 7, 2013; pp. 136-156.*

(Continued)

*Primary Examiner* — Joseph R Kudirka
(74) *Attorney, Agent, or Firm* — Fleit Gibbons Gutman Bongini Bianco PL; Jose Gutman

(57) ABSTRACT

An information processing system, computer readable storage medium, and method for supporting resilient execution of computer programs. A method provides a resilient store wherein information in the resilient store can be accessed in the event of a failure. The method periodically checkpoints application state in the resilient store. A resilient executor comprises software which executes applications by catching failures. The method uses the resilient executor to execute at least one application. In response to the resilient executor detecting a failure, restoring application state information to the at least one application from a checkpoint stored in the resilient store, the resilient executor resuming execution of the at least one application with the restored application state information.

17 Claims, 5 Drawing Sheets

```
The ResilientComputation interface may include the following methods:

• // Run the computation. run() should also checkpoint the state of the
• // computation periodically by calling the checkpoint() method of ResilientExecutor)
•     public def run(): void;

• // Restore the state of the computation to the last consistent checkpoint after a failure.
•     public def restore(): void;

•// Checkpoint application-specific data structures at a specific place. Since the
•// ResilientExecutor class provides a fault-tolerant way of iterating over the all places for
•// checkpointing and ResilientMap provides a convenient interface for resiliently storing data,
•// this method is intended to be easy to implement.
•     public def checkpointAtPlace(): void;

• // Performs application-specific operations to checkpoint data structures
• // at place 0. This method takes advantage of the fact that place 0 will not fail. If there is
• // nothing to specifically checkpoint at place 0, this method can be null.
•     public def checkpointAtPlace0(): void;

•// delete data from a previous checkpoint. This method optimizes space usage. The programmer
•// can choose not to implement the method in which case the obsolete checkpoint will eventually be
•// deleted but will be kept around for longer.
•     public def deleteAtPlace(): void;
```

Related U.S. Application Data continuation of application No. 14/657,132, filed on Mar. 13, 2015, now Pat. No. 9,652,336.

(56) References Cited

U.S. PATENT DOCUMENTS

| | | |
|---|---|---|
| 6,718,486 B1 | 4/2004 | Roselli et al. |
| 7,165,186 B1 | 1/2007 | Viswanatham et al. |
| 7,924,613 B1 | 4/2011 | Sommer et al. |
| 8,041,994 B2 | 10/2011 | Grinshpun et al. |
| 8,745,442 B1 | 6/2014 | Havemose |
| 8,909,987 B2 | 12/2014 | Karp et al. |
| 2008/0276239 A1 | 11/2008 | Collins et al. |
| 2009/0079686 A1 | 3/2009 | Herz et al. |
| 2010/0268931 A1 | 10/2010 | Borkar et al. |
| 2012/0159504 A1 | 6/2012 | Oshman et al. |
| 2013/0110937 A1 | 5/2013 | Burns et al. |
| 2013/0311823 A1 | 11/2013 | Kaplan et al. |
| 2014/0059552 A1 | 2/2014 | Cunningham et al. |
| 2014/0129873 A1 | 5/2014 | McGill et al. |
| 2014/0149485 A1 | 5/2014 | Sharma et al. |
| 2014/0310571 A1 | 10/2014 | Fetterly et al. |

OTHER PUBLICATIONS

Cunningham, D, et al.; "Resilient X10: Efficient Failure-Aware Programming", PPoPP'14 Proceedings of the 19th ACM SIGPLAN Symposium on Principles and Practice of Parallel Programming, Feb. 15-19, 2014, pp. 1-14, vol. 49, Issue 8.

Rieger, C, et al.; "Resilient Control System Execution Agent (ReCoSEA)", Resilient Control Systems (ISRCS), IEEE 5th International Symposium, Aug. 14-16, 2012, pp. 1-6.

Sharma, V. et al.; "Implementing a Resilient Application Architecture for State Management on A PaaS Cloud", on IEEE 5th International Conference on Cloud Computing Technology and Science (CloudCom), Dec. 2-5, 2013, pp. 1-6, vol. 1.

Nguyen, T. et al.; "Resilient Workflows for High-Performance Simulation Platforms", IEEE International Conference on High Performance Computing and Simulation (HPCS), Jun. 28-Jul. 2, 2010, pp. 1-7.

United Kingdom Combined Search and Examination Report under Sections 17 and 18(3) dated Jul. 28, 2016, received for Application No. GB1604052.9.

Non-Final Office Action dated Aug. 11, 2016, received for U.S. Appl. No. 14/749,835.

Non-Final Office Action dated Aug. 11, 2016, received for U.S. Appl. No. 14/657,132.

List of IBM Patents or Patent Applications Treated as Related.

First Office Action for Chinese Application No. 201610140638.4 dated Aug. 3, 2018.

* cited by examiner

FIG. 2

The ResilientComputation interface may include the following methods:

- // Run the computation. run() should also checkpoint the state of the
- // computation periodically by calling the checkpoint() method of ResilientExecutor)
  - public def run(): void;

- // Restore the state of the computation to the last consistent checkpoint after a failure.
  - public def restore(): void;

- // Checkpoint application-specific data structures at a specific place. Since the
- // ResilientExecutor class provides a fault-tolerant way of iterating over the all places for
- // checkpointing and ResilientMap provides a convenient interface for resiliently storing data,
- // this method is intended to be easy to implement.
  - public def checkpointAtPlace(): void;

- // Performs application-specific operations to checkpoint data structures
- // at place 0. This method takes advantage of the fact that place 0 will not fail. If there is
- // nothing to specifically checkpoint at place 0, this method can be null.
  - public def checkpointAtPlace0(): void;

- // delete data from a previous checkpoint. This method optimizes space usage. The programmer
- // can choose not to implement the method in which case the obsolete checkpoint will eventually be
- // deleted but will be kept around for longer.
  - public def deleteAtPlace(): void;

FIG. 3

The ResilientIterativeComputation interface may include the following methods:

// Advance the state of the computation by one step
    public def step(): void;

-

// Return true iff the computation executing under the ResilientExecutor
// framework should continue executing. It is typically called after each step.
    public def notFinished(): Boolean;

-

// Restore the state of the computation to the last consistent checkpoint after a failure.
    public def restore(): void;

-

// Checkpoint application-specific data structures at a specific place. Since the ResilientExecutor class
// provides a fault-tolerant way of iterating over the all places for checkpointing and ResilientMap
// provides a convenient interface for resiliently storing data, this method is intended to be
// easy to implement.
    public def checkpointAtPlace(): void;

-

// Performs application-specific operations to checkpoint data structures
// at place 0. This method takes advantage of the fact that place 0 will not fail. If there is
// nothing to specifically checkpoint at place 0, this method can be null.
    public def checkpointAtPlace0(): void;

-

// delete data from a previous checkpoint. This method optimizes space usage. The programmer can
// choose not to implement the method in which case the obsolete checkpoint will eventually be
// deleted but will be kept around for longer.
    public def deleteAtPlace(): void;

FIG. 4

- The ResilientExecutor class may include the following methods which an application can invoke:

- 
- // create a new instance of the ResilientExecutor class for the application "comp"
  - public def this(comp:ResilientComputation);
- 
- // create a new instance of the ResilientExecutor class for the iterative application "comp"
  - public def this(comp:ResilientIterativeComputation);
- 
- // Run computation resiliently by invoking the application-specific run method in
- // ResilientComputation. Handle failures by resiliently invoking the application-specific restore
- // method in ResilientComputation.
  - public def runResiliently(): void;
- 
- // Run iterative computation resiliently, handling failures
  - public def iterateResiliently(): void;
- 
- // Checkpoint the computation resiliently over all places. Store application-specific data in
- //resilient storage by invoking the checkpointAtPlace method in ResilientComputation.
  - def checkpoint(): void;

FIG. 5

- The ResilientExecutor class may include the following methods which an application can invoke:

- //Return number of completed checkpoints so far */
- public def numberOfCheckpoints(): Int;

-

- // Compute a key for an object to be used for checkpoint operations. This allows application
- // programs to use the ResilientMap interface for checkpointing data without having to
- //  manually calculate keys.
- public def key(keyRoot: String, restore: Boolean): String;

-

- // Return virtual place map corresponding to the computation. This method allows the
- // application to use virtual places.
- public def getVirtualPlaceMap():VirtualPlaceMap;

RESILIENT PROGRAMMING FRAMEWORKS FOR HANDLING FAILURES IN PARALLEL PROGRAMS

BACKGROUND

The present disclosure generally relates to fault-tolerant computing, and more particularly relates to a method and system for resilient computer programming frameworks for handling failures in executing parallel computer programs.

Failures in executing computer programs constitute a significant problem. The problem is compounded in multi-processor environments where failure of a single processor can cause a computation to fail, requiring it to be run from scratch.

In recent years, frameworks such as map reduce (Hadoop is a well-known implementation, http://hadoop.apache.org/), Spark (https://spark.apache.org/) and Pregel ("Pregel: A System for Large-Scale Graph Processing", Malewicz et al, Proceedings of SIGMOD 2010, http://kowshik.github.io/JPregel/pregel_paper.pdf) have been introduced which provide some degree of resilience to failures. A main drawback to these previous approaches has been that they were only applicable for applications which follow certain regular patterns. There are many applications which do not fit within the paradigms of map-reduce or Pregel.

MPI (http://www.mcs.anl.gov/research/projects/mpi/) has been often used to program parallel computing systems. However, while MPI has provided message-passing support, it has not provided a full-fledged programming environment. Instead, it was designed to be used in conjunction with existing programming languages such as C, C++, Fortran, Java, etc.

There is thus a need for more general frameworks which help programmers write resilient programs.

BRIEF SUMMARY

According to one embodiment of the present disclosure, a method for supporting resilient execution of computer programs comprising the steps of: providing a resilient store wherein information in the resilient store can be accessed in the event of a failure; periodically checkpointing application state in the resilient store; providing a resilient executor which comprises software which executes applications by catching failures; using the resilient executor to execute at least one application; and in response to the resilient executor detecting a failure, restoring application state information from a checkpoint in the resilient store, the resilient executor resuming execution of the at least one application.

According to another embodiment of the present disclosure, an information processing system capable of supporting resilient execution of computer programs, the information processing system comprising: memory; persistent memory for storing data and computer instructions; a resilient store, communicatively coupled with the memory and the persistent memory, wherein information stored in the resilient store can be accessed in the event of a failure of an application executing in the information processing system; a resilient executor, communicatively coupled with the memory and the persistent memory, for executing computations of applications by catching failures in the execution of the computations; a processor, communicatively coupled with the resilient executor, resilient store, the memory, the persistent memory, and wherein the processor, responsive to executing computer instructions, performs operations comprising: periodically checkpointing application state in the resilient store; executing, with the resilient executor, computations of an application while catching failures in the execution of the computations; restoring, based on the resilient executor detecting a failure in the execution of a computation of the application, application state information for the application from a checkpoint in the resilient store; and resuming, with the resilient executor, execution of the computation of the application with the restored application state information.

According yet to another embodiment of the present disclosure, a computer readable storage medium comprises computer instructions which, responsive to being executed by a processor, cause the processor to perform operations for supporting resilient execution of computer programs, the operations comprising: providing a resilient store wherein information in the resilient store can be accessed in the event of a failure; periodically checkpointing application state in the resilient store; providing a resilient executor which comprises software which executes applications by catching failures; using the resilient executor to execute at least one application; and in response to the resilient executor detecting a failure, restoring application state information to the at least one application from a checkpoint stored in the resilient store, the resilient executor resuming execution of the at least one application with the restored application state information.

BRIEF DESCRIPTION OF THE SEVERAL VIEWS OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 2 is a program listing illustrating an example of a ResilientComputation interface, according to various examples of the present disclosure;

FIG. 3 is a program listing illustrating an example of a ResilientIterativeComputation, according to various examples of the present disclosure;

FIGS. 4 and 5 constitute a program listing illustrating an example of a ResilientExecutor class that can be communicatively coupled with an application, according to various examples of the present disclosure.

DETAILED DESCRIPTION

Figure 1:
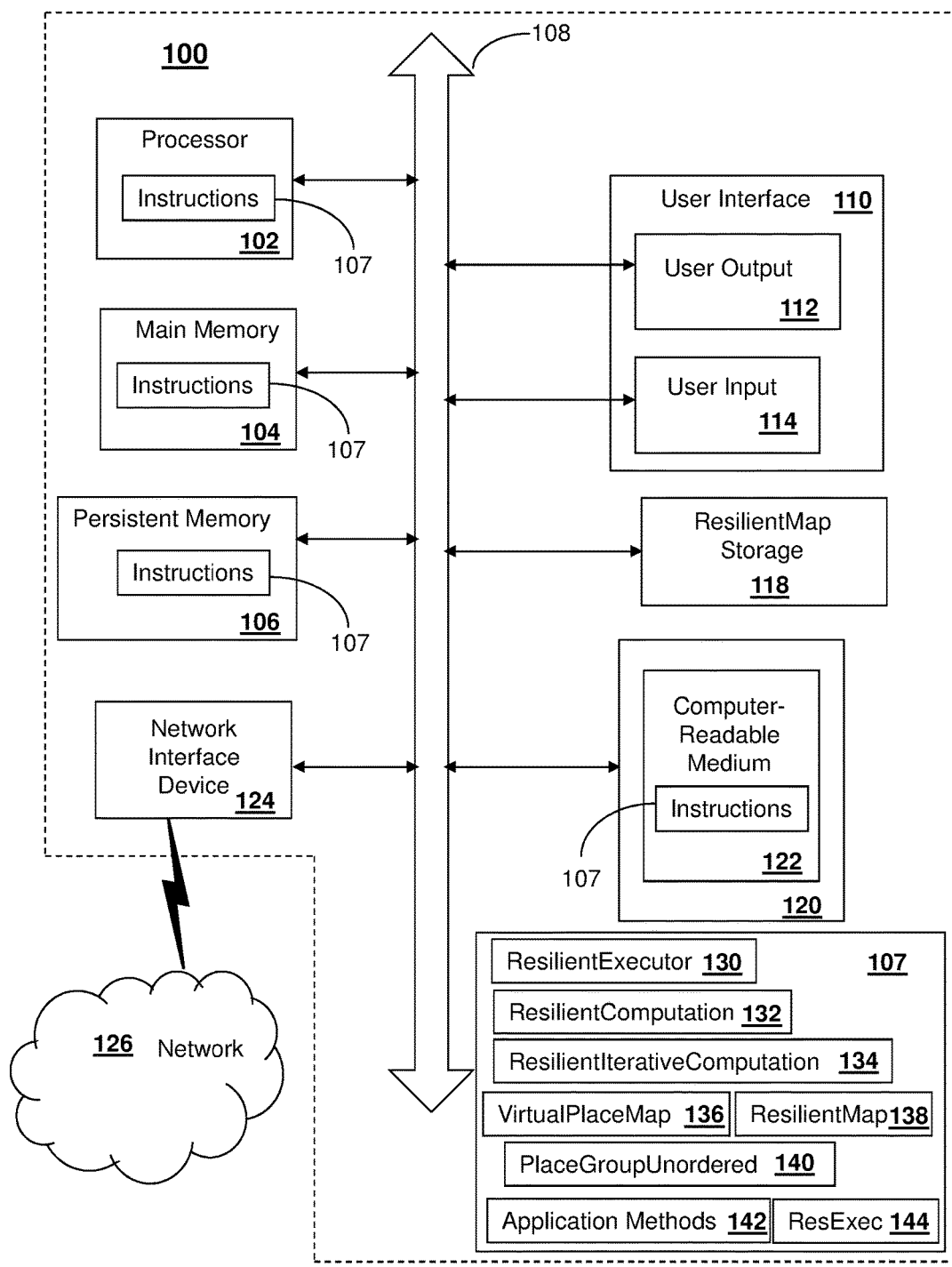
FIG. 1 is a block diagram illustrating an example of an information processing system in which a computer programming framework is implemented, according to the present disclosure.

According to various embodiments of the present disclosure, disclosed is a system and method providing a new computer programming framework for programmers to write resilient programs. Low level details such as catching and handling failures are handled by special software. This relieves significant programming burdens from software programmers and particularly from programmers of modern parallel computing applications.

Various embodiments of the disclosure are applicable to computer programming frameworks for software applications comprising a state machine with a state which can be periodically saved as a stored checkpoint. In the event of a failure, an application can be restarted from application state information restored from a previous stored checkpoint. If an application can be properly restored without referring to any saved state (e.g., the application already stores all of the state information needed for recovery in persistent storage, such as on disk), it is even easier to use an embodiment of the present disclosure for handling program resilience.

According to various embodiments, a programming framework provides software allowing an application to achieve resilience. It greatly simplifies the task of writing resilient programs.

Various embodiments of the present disclosure provide to application programs one or more of the following features:

1) an ability to execute an application program using exception handling which detects failed places. The term "place" refers to at least a part of an executing computation that may be for an application, such as a process (or in some cases, one or more threads). A place may comprise an entity executing a computation.

2) an ability to reliably checkpoint data structures in an application so that the data structures will be preserved in the event of a failure.

3) virtual places which hide the actual physical places on which a computation is executing. Programs reference virtual places instead of physical places. That way, if a physical place fails, the computation can continue to reference virtual places which do not fail. Virtual places are mapped to physical places. Mappings of virtual to physical places can be updated to mask physical place failures.

Various non-limiting example embodiments of the present disclosure are described herein using, for illustration purposes only, the X10 programming language "X10 Language Specification Version 2.5", Saraswat et. al, http://x10.sourceforge.net/documentation/languagespec/x10-latest.pdf. Additional information about X10 is available from: http://x10-lang.org/

An embodiment of the present disclosure could also be implemented for other programming languages and programming environments as well.

The ResilientComputation/ResilientExecutor framework, as will be discussed below, allows X10 programs to be written so that the programmer does not have to worry about low level failure handling. Low level details for handling failures such as catching and handling dead place exceptions (which is a type of exception that is generated by the X10 run-time system when a place fails) are handled by a ResilientExecutor class (and classes that it makes use of such as VirtualPlaceMap and ResilientMap).

It is applicable, according various embodiments, for applications with state which can be periodically checkpointed. In the event of a failure, the application is restarted from the point of the last consistent checkpoint. If an application can be properly restored without any checkpointed state (e.g., the application already stores all of the state needed for recovery in persistent storage, such as on disk), it is even easier to use the framework for handling resilience.

The present example framework makes use of the following classes:

ResilientExecutor: The main class implementing the framework. See FIGS. 4 and 5 for an example.

ResilientComputation: An interface which specifies the application-specific methods that an application can use to implement the framework. See FIG. 2 for an example.

ResilientIterativeComputation: An interface which specifies the application-specific methods that an iterative application can use to implement the framework. See FIG. 3 for an example.

VirtualPlaceMap: A class implementing virtual places which hides the actual physical places used by the application so that the application does not have to deal directly with place failures. An example of the VirtualPlaceMap will be discussed below with reference to FIG. 3.

ResilientMap: provides resilient storage which is accessible in the event of place failures.

PlaceGroupUnordered: This class implements place groups in which the order in the place group may differ from the physical order of places. This is used for managing virtual places.

According to the present example, to use this framework an application can implement the ResilientComputation interface (generally applicable) or the ResilientIterativeComputation interface (for iterative computations). There are a wide variety of other interfaces within the spirit and scope of the present disclosure. The ResilientComputation interface, including its several methods, is shown in FIG. 2 according to the present example. The ResilientIterativeComputation interface, including its several methods, is shown in FIG. 3 according to the present example. The ResilientExecutor class, and its several methods, is shown in FIGS. 4 and 5 according to the present example.

The framework of the present disclosure, according to the present example, can be used with an information processing system as will be described in more detail below.

An application program is implemented as an instance (comp) of a class which implements the ResilientComputation interface. If the ResilientIterativeComputation interface or other interface is used instead, the process would be similar.

comp creates a new ResilientExecutor object, resExec, for the application program.

resExec.runResiliently( ) is called to invoke the run method in comp resiliently.

The run method in comp periodically invokes resExec.checkpoint to checkpoint the state of the computation.

If resExec.runResiliently encounters (e.g., detects and catches) exceptions (particularly, dead place exceptions), it resiliently restores the state of the computation to the previous checkpoint by invoking comp.restore. After the state of the computation is restored to the previous checkpoint, resExec.runResiliently continues the computation by invoking the run method in comp resiliently.

A main enabler for the above described approach using the framework is the use of virtual places. Virtual place numbers remain constant throughout a computation so that application-specific code does not need to be modified as the result of place failures. The ResilientExecutor class maintains the virtual place map and replaces dead physical places with live physical places to keep virtual place numbers consistent throughout a computation. Applications are written to iterate over virtual places instead of physical places.

The ResilientExecutor class is responsible for running application programs under an environment where place failures are automatically detected and caught via exception handling, and dead place exceptions in particular are properly dealt with. This class maintains a virtual place map to hide the fact that place failures may have occurred which necessitate the replacement of one or more physical places with other physical places. This class also provides a resilient environment for recovering from failures. Below is a summary of four features of the resilient framework:

1) Providing code to detect and recover from failures. User application code does not have to worry about low level failure detection either during normal processing or recovery. Exception handling is structured to provide resiliency for normal execution, checkpointing, and recovery from failures.

2) Providing support to efficiently checkpoint applications. The ResilientMap class is a main feature providing this support.

3) Applications refer to virtual places instead of actual physical places.

4) An object-oriented framework which provides a well-defined interface. The ResilientExecutor can be customized to handle different types of failures and different failure-handling requirements.

Two features of the resilient framework are: 1) it handles failure/recovery details so that the programmer does not have to deal with these details, and 2) it supports efficient checkpointing of application computations. This resilient framework is very general and supports efficient handling of a much broader range of applications than frameworks such as Hadoop, Spark, and Pregel.

Virtual Places

Virtual places can be used to mask place failures from programs. Programs refer to virtual places instead of the physical places on which a computation executes. Virtual places can remain constant during the execution of a program. The underlying physical places may change. For example, if a virtual place v1 is mapped to physical place p1 and p1 fails, then v1 can be mapped to another physical place p2. The program can continue to refer to virtual place v1 both before the failure of p1 and after the failure of p1. That way, the application programmer does not have to write special code to deal with the fact that places in a program may change due to failures.

There are multiple ways that the system can obtain another place p2 to replace failed place p1. One option is to have a number of spare places running at the start of a computation. Whenever a place fails, the failed place is replaced by a spare place. This method incurs overhead for spare places. In addition, problems occur if the system runs out of spare places.

Another method is to start up a new place at the time of a place failure to replace the failed place. This avoids the drawbacks of failed places. There could be some overhead/delay in starting up a new place, though.

Virtual places are implemented by the class VirtualPlaceMap which includes the following methods which an application program can invoke to use:

```
/* Construct virtual place map identical to physical place map for first
 * numPlaces places. Throw an exception if numPlaces is out of range
 */
public def this(numPlaces: Long) {
/* Return the virtual place id corresponding to "place". Return
 * NONEXISTENT_PLACE if no virtual place is found corresponding to "place"
 */
public def physicalToVirtual(place: Place): Long {
/**
 * Return a key that is specific to the virtual place corresponding to the
 * current place. If the current place is not part of the virtual place
 * map, return NONEXISTENT_PLACE_STRING. Useful for generating keys for
 * storing place local data in resilient stores.
 */
public def placeSpecificKey(keyRoot: String): String {
/* Print out the contents of a virtual place map
 */
public def printVirtualPlaceMap( ): void {
/* Replace virtual place with id "id" with physical place "Place". Throw
 * an exception if "id" is out of range
 */
public def replaceVirtualPlace(id: Long, place: Place): void {
/* Return total number of virtual places in the map
 */
public def totalVirtualPlaces( ): Long {
/* Return physical place with id "id". Throw exception if id is out of
 * range
 */
public def virtualToPhysical(id: Long): Place {
```

Resilient Executor Implementation

The ResilientExecutor class, according to various embodiments, runs programs resiliently using the following methods. The resilient executor comprises software which executes applications by catching failures. The resilient executor can also handle at least one exception by recursively catching and handling additional exceptions which occur. Below will be discussed how the ResilientExecutor class can be implemented using the X10 programming language. It is also possible to implement our invention using other programming languages. Note in the methods below that "computation" and "iterativeComputation" are objects representing the application. According to various embodiments, a framework implementation could have more objects to represent additional types of applications within the spirit and scope of the present disclosure.

```
// Run computation resiliently, handling failures
public def runResiliently( ): void {
    try {
        finish computation.run( ); // application-specific method
    } catch (e:MultipleExceptions) {
        Console.OUT.println("ResilientExecutor runResiliently has caught exceptions");
        handleExceptionsResiliently(e, 0n);
            restoreResiliently(NUM_RECOVERY_ATTEMPTS);
    }
}
// Run iterative computation resiliently, handling failures
public def iterateResiliently( ): void {
        var keepIterating: Boolean = true;
    try {
        finish {
            Console.OUT.println("ResilientExecutor about to invoke iterative computation");
            while (keepIterating) {
                iterativeComputation.step( ); // application-specific method
                iterativeComputation.checkpoint( ); // application-specific method
                keepIterating = iterativeComputation.notFinished( ); // application-specific
method
            }
        }
    } catch (e:MultipleExceptions) {
        Console.OUT.println("ResilientExecutor iterateResiliently has caught exceptions");
        handleExceptionsResiliently(e, 0n);
            restoreResiliently(NUM_RECOVERY_ATTEMPTS);
    }
}
```

If additional types of computations are used, it is possible to have additional run methods within the spirit and scope of the invention.

If the run methods encounter failures, they attempt (e.g., invoking a recovery method) to resiliently restore the state of the computation via:

```
// Restore computation resiliently, handling failures
public def restoreResiliently(attemptsLeft:Int): void {
    if (attemptsLeft < 1n)
            throw new Exception("Error in ResilientExecutor.X10 restoreResiliently: Recovery from failure failed too many times");
        else {
            try {
                finish restore( );
            } catch (e:MultipleExceptions) {
                handleExceptionsResiliently(e, 0n);
                    restoreResiliently(attemptsLeft – 1n);
            }
                resumeExecution( );
        }
}
```

The restoreResiliently method invokes application-specific methods to restore the state of the computation of the application. It might restore application state information from a checkpoint stored in resilient storage. Below is the code for restore. Note that "computation" and "iterativeComputation" are objects representing the application. A particular embodiment could have more objects to represent additional types of applications within the spirit and scope of the present disclosure.

```
private def restore( ) {
    switch (computationType) {
        case GENERAL: computation.restore( ); // application-specific method
            break;
        case ITERATIVE: iterativeComputation.restore( ); // application-specific method
            break;
        default:
            throw new Exception("Error in ResilientExecutor.X10: unknown value of computationType in restore( ): " + computationType);
    }
}
```

It is critically important to catch and handle exceptions properly. This is achieved by the following method which is targeted to identifying dead place exceptions. A dead place exception is an exception which occurs when a place fails. It would be possible to extend this method within the spirit and scope of the invention to handle other types of exceptions as well.

```
// resilient method for handling exceptions
   private def handleExceptionsResiliently(e:MultipleExceptions,
numExceptionsHandledSoFar:Int):void {
      val exceptions = e.exceptions; // e is a Rail of CheckedThrowable
      val numExceptions = exceptions.size;
      var numExceptionsHandled:Int = numExceptionsHandledSoFar;
      try {
         finish
            while (numExceptionsHandled < numExceptions) {
               if (exceptions(numExceptionsHandled) instanceof MultipleExceptions)
                  handleExceptionsResiliently(exceptions(numExceptionsHandled) as
MultipleExceptions, 0n);
               else if (!(exceptions(numExceptionsHandled) instanceof DeadPlaceException)) {
                  Console.OUT.println("Error: Exception encountered. Here is the stack trace: ");
                     e.printStackTrace( );
                     System.killHere( );
               }
               else {
                     val deadPlace = (exceptions(numExceptionsHandled) as
DeadPlaceException).place;
                     handleDeadPlace(deadPlace);
               }
               numExceptionsHandled++;
            } // while
      }
      catch (e2:MultipleExceptions) {
         handleExceptionsResiliently(e2, 0n);
         handleExceptionsResiliently(e, numExceptionsHandled);
      }
}
```

When dead places are detected by catching and identifying a dead place exception, they are handled by the following method. A key point is that the application program is referring to places using virtual places which never die. Virtual places are mapped to physical places. After a physical place dies, a live physical place is mapped to the virtual place previously corresponding to the dead physical place.

```
public def handleDeadPlace(deadPlace: Place): void {
   if (deadPlace.id( ) >= 0 && deadPlace.id( ) < isDeadPlace.size &&
!isDeadPlace(deadPlace.id( ))) {
      isDeadPlace(deadPlace.id( )) = true;
      val virtualId = virtualPlaces.physicalToVirtual(deadPlace);
      if (virtualId != VirtualPlaceMap.NONEXISTENT_PLACE) {
         virtualPlaces.replaceVirtualPlace(virtualId, getNewPlace( ));
      }
   }
}
```

The restoreResiliently method shown previously calls resumeExecution( ) to continue execution of the application program after failures have been properly handled. Below is the code for resumeExecution:

```
// Resume computation after a failure has been handled.
def resumeExecution( ){
   switch (computationType) {
      case GENERAL: runResiliently( );
         break
      case ITERATIVE: iterateResiliently( );
         break;
      default:
         throw new Exception("Error in ResilientExecutor.X10: unknown value of
computationType in resumeExecution( ): " + computationType);
   }
}
```

Note that it is straightforward, within the spirit and scope of the present disclosure, to extend resumeExecution to handle other types of computations besides GENERAL and ITERATIVE.

A main aspect of the present disclosure is checkpointing. The resilient executor provides the following methods for checkpointing which are invoked by application programs.

```
/* Checkpoint the computation. This is called within transitively from
 * runResiliently, so exceptions are already being caught and handled.
 */
public def checkpoint( ): void {
    finish for (i in 0..(virtualPlaces.totalVirtualPlaces( ) - 1)) {
        val p:Place = virtualPlaces.virtualToPhysical(i);
        async
            at (p) checkpoint AtPlace( );
    } // this could fail with dead place exception
        checkpoint AtPlace0( ); // assume that this won't fail
        numCheckPoints++;
    if (numCheckPoints > 1) {
        deleteCheckPoint( );
    }
}
private def checkpointAtPlace( ) {
    switch (computationType) {
      case GENERAL: computation.checkpointAtPlace( ); // application-specific method
        break;
      case ITERATIVE: iterativeComputation.checkpointAtPlace( ); // application-specific method
        break;
      default:
        throw new Exception("Error in ResilientExecutor.X10: unknown value of computationType in checkpointAtPlace( ): " + computationType);
    }
}
private def checkpointAtPlace0( ) {
    switch (computationType) {
      case GENERAL: computation.checkpointAtPlace0( ); // application-specific method
        break;
      case ITERATIVE: iterativeComputation.checkpointAtPlace0( ); // application-specific method
        break;
      default:
        throw new Exception("Error in ResilientExecutor.X10: unknown value of computationType in checkpointAtPlace0( ): " + computationType);
    }
}
```

According to the present example which uses an X10 implementation, a special place, Place 0, is assumed to never fail. Therefore, an embodiment of the present disclosure can safely checkpoint at least some application state information at Place 0. This is one reason for having the checkpointAtPlace0( ) method. If a system cannot assume that a Place 0 exists which never fails, then an application would not use the checkpointAtPlace0( ) method.

When a new checkpoint $c_1$ is taken, the present example maintains the previous checkpoint $c_0$ stored in resilient storage. That way, if a failure occurs while $c_1$ is being computed, the system will still have $c_0$ to restore a state to the executing application. After $c_1$ has completely computed, it is safe to delete $c_0$. The ResilientExecutor, according to the present example, has the following methods to delete the old checkpoint $c_0$ right after $c_1$ has been completely computed:

```
/* Delete previous checkpoint. This is only called after a new
 * checkpoint has successfully completed.
 */
def deleteCheckPoint( ) : void {
    finish for (i in 0..(virtualPlaces.totalVirtualPlaces( ) - 1)) {
        val p:Place = virtualPlaces.virtualToPhysical(i);
        async
            at (p) delete AtPlace( );
    }
}
private def deleteAtPlace( ) {
    switch (computationType) {
      case GENERAL: computation.deleteAtPlace( ); // application-specific method
        break;
      case ITERATIVE: iterativeComputation.deleteAtPlace( ); // application-specific method
        break;
```

```
        default:
            throw new Exception("Error in ResilientExecutor.X10: unknown value of
computationType in deleteAtPlace( ): " + computationType);
        }
    }
```

The application has the option of defining a deleteAt-Place( )method which deletes the previous checkpoint right away. If the application chooses not to do so, the application will still continue to run resiliently and correctly. The only drawback may be that the old checkpoint c0 will continue to exist stored in resilient storage (instead of being immediately deleted) until the next checkpoint is taken and overwrites c0.

An Example of Use of the ResilientExecutor Class by Applications

With reference to FIGS. 1 to 5, below will be discussed an example of an information processing system 100 that can resiliently execute an application using the ResilientExecutor class. For illustration purposes only, and not for any limitation of the present disclosure, an example application to be executed by the information processing system 100 is a molecular mechanics simulation implemented as a ResilientIterativeComputation.

The application creates an instance of a ResilientExecutor class:

resExec=new ResilientExecutor(this);

The resilient executor is then invoked via:

resExec.iterateResiliently( );

The application implements a number of methods which the ResilientExecutor instance executes resiliently using exception handling described earlier. These methods include:

```
// called by ResilientExecutor
public def step( ): void {
    mdStep(timestep);
    step++;
}
public def notFinished( ): Boolean {
    return (step < numSteps);
}
```

The following code checkpoints the application and is invoked by the ResilientExecutor instance:

```
// checkpoint computation
public def checkpoint( ): void {
    if ((step % ITERATIONS_PER_BACKUP) == 0) {
        // checkpoint atoms and forceField at place 0
        resExec.checkpoint( ); // resExec is the ResilientExecutor
        instance
    }
}
```

Note that in order to reduce the checkpointing overhead, checkpoints are not necessarily invoked after every iteration. If after each iteration a checkpoint is invoked, checkpointing overhead might be high. An advantage is that recovery time will be short. If checkpointing is invoked less frequently (i.e. ITERATIONS_PER_BACKUP is an integer larger than 1), this will reduce checkpointing overhead. The disadvantage is that recovery time will be longer. There is thus a trade-off between checkpointing overhead and recovery time. Frequent checkpoints increase checkpointing overhead but reduce recovery time after a failure compared with less frequent checkpoints.

The application implements the following application-specific checkpointing methods which are invoked by the ResilientExecutor instance:

```
public def checkpoint AtPlace0( ): void {
    forceFieldBackup = Runtime.deepCopy(forceField);
}
public def checkpointAtPlace( ): void {
    val key = resExec.key(ATOMS_ROOT, false);
    backup.put(key, atoms( ));
}
```

The application implements the following application-specific method which is invoked by the ResilientExecutor instance to delete obsolete checkpoints. It should be noted that this method is optional. If it is not implemented, the program will continue to operate correctly and resiliently. The advantage to implementing the method is that it reduces space overhead consumed by checkpoints.

```
public def deleteAtPlace( ): void {
    val key = resExec.key(ATOMS_ROOT, false);
    backup.remove(key);
}
```

In the event of a failure, the following application-specific method is invoked by the ResilientExecutor instance to restore the state of the computation from a previous checkpoint:

```
public def restore( ) {
    virtualPlaceMap = resExec.getVirtualPlaceMap( );
    placeGroup = new PlaceGroupUnordered(virtualPlaceMap.getVirtualMap( ));
    forceField = Runtime.deepCopy(forceFieldBackup);
    atoms = PlaceLocalHandle.make[Rail[MMAtom]](placeGroup,
        ( )=>(backup.get(resExec.key(ATOMS_ROOT, true))));
    step = (resExec.numberOfCheckpoints( ) - 1) * ITERATIONS_PER_BACKUP;
}
```

Virtual places are also a key element of this application. The application refers to virtual places instead of physical places throughout the computation. These virtual places do not change, even if one or more physical places die while the computation is progressing.

According to the present example, the information processing system 100 (see FIG. 1) comprises at least one processor 102 communicatively coupled with memory 104 and with persistent non-volatile memory 106. The persistent memory 106 can store computer instructions 107, data, configuration parameters, and other information that is used by the processor 102. All of these stored components stored in persistent memory 106 can be individually, or in any combination, stored in main memory 104 and in the processor cache memory 102. According to the present example, a bus communication architecture 108 in the information processing system 100 facilitates communicatively coupling the various elements of the information processing system 100. A network interface device 124 is communicatively coupled with the processor 102 and provides a communication interface to communicate with one or more external networks 126.

While FIG. 1 is one possible embodiment of the invention, many other embodiments are possible. The invention is of particular relevance to systems with multiple processors. Thus, the earlier descriptions of the invention are more general and are applicable to a much wider variety of systems than the one depicted in FIG. 1.

The instructions 107 may comprise one or more of the following which have been discussed in more detail above: a ResilientExecutor class 130, a ResilientComputation 132, a ResilientIterativeComputation 134, a VirtualPlaceMap 136, a ResilientMap 138, a PlaceGroupUnordered 140, a ResExec method 144, and other application methods 142.

In persistent memory 106, there is a ResilientMap storage area 118. A computer storage device 120 is communicatively coupled with the processor 102. The computer storage device 120 can be communicatively coupled with a computer readable storage medium 122. The computer readable storage medium 122 can store at least a portion of the instructions 107.

A user interface 110 is communicatively coupled with the processor 102. The user interface 110 comprises a user output interface 112 and a user input interface 114. The user output interface 112 includes, according to the present example, a display, and audio output interface such as one or more speakers, and various indicators such as visual indicators, audible indicators, and haptic indicators. A user input interface 114 includes, according to the present example, a keyboard, a mouse or other cursor navigation module such as a touch screen, touch pad, a pen input interface, and a microphone for input of audible signals such as user speech, data and commands that can be recognized by the processor 102.

FIG. 2 illustrates an example ResilientComputation interface 132 which includes several methods. The run method runs the computation and additionally creates a checkpoint of the state of the application computation periodically. If there is a failure in one or more places executing computations of the application, the restore method can be invoked to restore the state of the application computation to the last checkpoint stored in the ResilientMap storage 118. Checkpoint data structures may be saved at place 0. Also, specific checkpoint data structures at specific places may be checkpointed to the ResilientMap storage 118. After a new checkpoint of a state of an application computation is saved to the ResilientMap storage 118, optionally the previous checkpoint stored in ResilientMap storage 118 can be deleted from the resilient storage. This optimizes space usage by deleting stale and unnecessary application state information from the ResilientMap storage 118.

FIG. 3 illustrates an example ResilientIterativeComputation Interface 134 which includes several methods. The step method is used to advance the state of a computation by one step. The notFinished method indicates whether the computation should continue executing. It is typically invoked by the resilient framework after each step of an iterative computation. A restore method restores the state of the application computation to the last stored checkpoint after a failure is detected. A method deleteAtPlace can be invoked by the resilient framework to delete a previously stored checkpoint from the ResilientMap storage 118. This method optimizes space usage by deleting stale and unnecessary application state information from the ResilientMap storage 118.

Referring to FIGS. 4 and 5, the ResilientExecutor class 130 includes several methods which can be invoked by an application. The ResilientComputation creates a new instance for a computation of the application. The ResilientIterativeComputation creates a new instance for an iterative computation of the application.

The runResiliently method invokes an application specific run method to resiliently execute one or more computations of the application. The runResiliently method can invoke an application specific restore method that restores application state information from a previous checkpoint stored in the ResilientMap storage 118.

A checkpoint method stores application specific data in ResilientMap storage 118. A numberOfCheckpoints method provides a total number of completed checkpoints so far. A key method can be invoked to compute a key for an object to be used for checkpoint operations. This allows application programs to use the ResilientMap Interface for checkpointing data without having to manually calculate keys. A getVirtualPlaceMap method returns the virtual place map corresponding to a computation of the application. This method allows the application to use virtual places.

Various Aspects of a Resilient Framework According to the Present Disclosure

1) Use of a resilient store for checkpointing, and efficient and easy-to-use checkpointing techniques.

2) Use of virtual places to mask dead places.

3) An effective way to catch relevant exceptions and handle failures during execution, a restore phase after a failure, and an exception-handling method in the resilient framework.

4) Object-oriented framework and API to make the approach easy to use.

The present disclosure has illustrated by example a novel information processing system and a novel method that provide a new computer programming framework for programmers to write resilient programs. Low level details such as catching and handling failures are handled by special software. This relieves significant programming burdens from software programmers and particularly from programmers of modern parallel computing applications.

Non-Limiting Examples

As will be appreciated by one of ordinary skill in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

Various embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the computer readable storage medium is shown in an example embodiment to be a single medium, the term "computer readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methods of the subject disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a computer-readable storage medium, as listed herein and including art-recognized equivalents and successor media, in which the software implementations herein are stored.

Although the present specification may describe components and functions implemented in the embodiments with reference to particular standards and protocols, the disclosure is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor 102 is illustrated for information processing system 100, information processing systems with multiple CPUs or processors can be used equally effectively. Various embodiments of the present disclosure can further incorporate interfaces that each includes separate, fully programmed microprocessors that are used to off-load processing from the processor 102. An operating system (not shown) included in main memory for the information processing system 100 may be a suitable multitasking and/or multiprocessing operating system, such as, but not limited to, any of the Linux, UNIX, Windows, and Windows Server based operating systems. Various embodiments of the present disclosure are able to use any other suitable operating system. Various embodiments of the present disclosure utilize architectures, such as an object oriented framework mechanism, that allows instructions of the components of operating system (not shown) to be executed on any processor located within the information processing system. Various embodiments of the present disclosure are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The term "place" as used herein is intended to broadly describe at least a part of an executing computation that may be for an application, such as a process (or in some cases, at least one thread). The term "virtual place" as used herein is intended to broadly describe a place that is referenced by executing programs, where the actual physical place on which a computation is executing is hidden from the referencing programs that use the virtual place instead of the actual physical place. Virtual places are mapped to physical places. Mappings of virtual places to physical places can be updated to mask physical place failures.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. A method for supporting resilient execution of applications written in a programming language with exception handling, the method comprising:
   providing a resilient executor which comprises software which executes applications while detecting failures of the executing applications;
   providing an interface allowing programs to explicitly reference a place to communicate with or execute at least one computation on the place, wherein each place is an entity executing a computation;
   providing a virtual place abstraction layer which defines a mapping between virtual places and physical places;
   providing an interface allowing an application to communicate with or execute at least one computation on a physical place p1 by referencing a virtual place p2 which is mapped to physical place p1; and
   in response to a physical place p3 failing, wherein virtual place p4 maps to physical place p3, updating the mapping so that virtual place p4 maps to physical place p5 wherein physical place p5 is live.

2. The method of claim 1, further comprising:
   providing a resilient store wherein information in the resilient store is accessible in the event of a failure.

3. The method of claim 2, further comprising:
   periodically checkpointing an application state in the resilient store.

4. The method of claim 3, further comprising:
   using the resilient executor to execute at least one application, wherein the resilient executor includes computer code which is part of the at least one application.

5. The method of claim 4, further comprising:
   in response to the resilient executor detecting a failure, by catching with said computer code at least one exception, restoring application state information from a checkpoint in the resilient store.

6. The method of claim 5, further comprising:
   the resilient executor resuming execution of the at least one application based on the restored application state information.

7. The method of claim 6, in which the resilient executor further comprises:
   an interface allowing applications to use the resilient executor;
   a resilient run method which the at least one application invokes via the interface which executes the at least one application while detecting and catching place failures as exceptions, the place failures comprising failures at a place of computation in the at least one application; and
   a recovery method which is invoked when the resilient run method catches an exception resulting from a particular failed place, wherein the recovery method recovers from the particular failed place failure, restores the at least one application to application state information from a checkpoint stored in the resilient store, and resumes execution of the at least one application with the application state information restored from the checkpoint stored in the resilient store.

8. The method of claim 4, in which the resilient executor invokes application-specific code to restore computation of the at least one application from a previous checkpoint.

9. The method of claim 4, in which the resilient executor is provided to the at least one application as an object.

10. The method of claim 9, in which the at least one application invokes a method on the object to resiliently run the at least one application.

11. The method of claim 9, in which the at least one application invokes a method on the object to resiliently checkpoint the at least one application.

12. The method of claim 1, in which a place comprises at least one of a process and a thread.

13. The method of claim 1, in which the resilient executor includes a run method which runs an application while catching exceptions.

14. The method of claim 1, in which the resilient executor includes a method for resiliently executing an iterative computation.

15. The method of claim 1, in which the resilient executor handles an iterative computation by invoking at least one of an application-specific method to execute an iteration of a computation of the application and an application-specific method to determine if the computation has finished.

16. The method of claim 1, in which the resilient executor handles at least one exception by recursively catching and handling additional exceptions which occur.

17. The method of claim 1, in which the resilient executor calls an application-specific method to checkpoint data across multiple places.

* * * * *